Nov. 3, 1970 E. L. PITYO 3,537,276

METHOD OF AND APPARATUS FOR PRODUCING MAGNETIC REED SWITCHES

Filed June 8, 1967 9 Sheets-Sheet 1

INVENTOR
EDWARD L. PITYO

BY B. P. Fishburne, Jr.
ATTORNEY

Nov. 3, 1970 E. L. PITYO 3,537,276

METHOD OF AND APPARATUS FOR PRODUCING MAGNETIC REED SWITCHES

Filed June 8, 1967 9 Sheets-Sheet 2

INVENTOR

EDWARD L. PITYO

BY [signature]

ATTORNEY

INVENTOR
EDWARD L. PITYO

B. P. Fishburne, Jr.
ATTORNEY

Nov. 3, 1970 E. L. PITYO 3,537,276

METHOD OF AND APPARATUS FOR PRODUCING MAGNETIC REED SWITCHES

Filed June 8, 1967 9 Sheets-Sheet 4

INVENTOR

EDWARD L. PITYO

BY

B. P. Fishburne, Jr.
ATTORNEY

METHOD OF AND APPARATUS FOR PRODUCING MAGNETIC REED SWITCHES

INVENTOR
EDWARD L. PITYO
BY B. P. Fishburne, Jr.
ATTORNEY

Nov. 3, 1970 E. L. PITYO 3,537,276

METHOD OF AND APPARATUS FOR PRODUCING MAGNETIC REED SWITCHES

Filed June 8, 1967 9 Sheets-Sheet 8

INVENTOR
EDWARD L. PITYO

BY

ATTORNEY

INVENTOR
EDWARD L. PITYO

BY B.P. Fishburne, Jr.
ATTORNEY 3,537,276

METHOD OF AND APPARATUS FOR PRODUCING MAGNETIC REED SWITCHES

Edward L. Pityo, Cedar Grove, N.J., assignor to Federal Tool Engineering Co., Cedar Grove, N.J., a corporation of New Jersey Filed June 8, 1967, Ser. No. 644,714
The portion of the term of the patent subsequent to Aug. 12, 1986, has been disclaimed
Int. Cl. C03c *29/00*
U.S. Cl. 65—59 12 Claims

ABSTRACT OF THE DISCLOSURE

An apparatus and method for assembling and sealing reed switches in a completely automatic cycle of operation including means for overlapping and gapping the magnetic reeds with a high degree of accuracy and uniformity. The apparatus includes an outboard loader which transports the three switch components automatically to the holding jaws of the fabricating apparatus, and the loader then retracts automatically to the loading station so that it can be reloaded without loss of time while the apparatus is continuing to fabricate the switch. Means provided to produce the final seal of the reed switch include a source of radiant energy, a forward reflector, a divided back reflector with a gap between the back reflector sections, and means for directing a purging gas stream through the gap.

This application contains subject matter in common with copending application Ser. No. 644,669, filed June 8, 1967 for Back Reflectory for Radiant Energy Glass-to-Metals Sealing Means, now Pat. No. 3,460,930, issued Aug. 12, 1969.

BACKGROUND OF THE INVENTION

The invention arises from the need for an improved apparatus and method for manufacturing reed switches in mass quantity, rapidly, and in compliance with very close dimensional tolerances, high quality of workmanship and high uniformity. More particularly, there is a need for improved techniques of accurately positioning and controlling the individual reeds and the glass envelope during the critical assembly steps and for effecting the sealing of the envelope about the reeds in a reliable manner. It has also been found desirable to produce the final sealing of the reed switch under a controlled positive pressure above atmospheric pressure. The present invention coordinates all of these steps plus a number of additional steps and features in an improved and novel manner and with efficiency.

Means are known in the prior art to facilitate the manufacturing of reed switches including, in a broad sense, a number of the basic steps and instrumentalities of this invention, but the prior art is lacking in the coordination of the processing steps and lacking therefore in the ability to produce the reed switches rapidly and completely automatically with a sufficient degree of uniformity, high quality workmanship and, above all, dimensional accuracy. All of these features are rendered possible by the present invention.

SUMMARY OF THE INVENTION

The invention includes efficient and automatic means for loading and prepositioning the two reeds relative to the glass envelope and for shifting these elements to the holding jaws of the fabricating apparatus while the jaws are open to receive the switch components, the loading means then retracting and returning automatically to the initial loading station. In a continuous cycle, the fabricating apparatus accurately establishes the relative positions of one reed and a glass envelope and then produces the desired overlapping of the two reeds while simultaneously establishing accurately the relative positions of the second reed and glass envelope. While accurately positioned, the reed are magnetically latched together and then relieved of any bending strain, followed quickly and automatically by the formation of the first glass seal by infrared radiant energy. Following this, the two reeds are gapped with extreme accuracy and the assembly is pressurized above atmospheric pressure followed by the completion of the second and final glass seal produced by infrared radiant energy. The assembly is continuously purged with a forming gas during both sealing operations to prevent corrosion or spalling. Each completed reed switch is then automatically ejected from the apparatus and the cycle is repeated.

BRIEF DESCRIPTION OF THE DRAWINGS

FIGS. 15*a*–15*h* inclusive are diagrammatic views which together with FIGS. 4 and 14 show the step-by-step procedure of producing each reed switch by the invention method;

DESCRIPTION OF THE PREFERRED EMBODIMENT

Figures 1, 2:
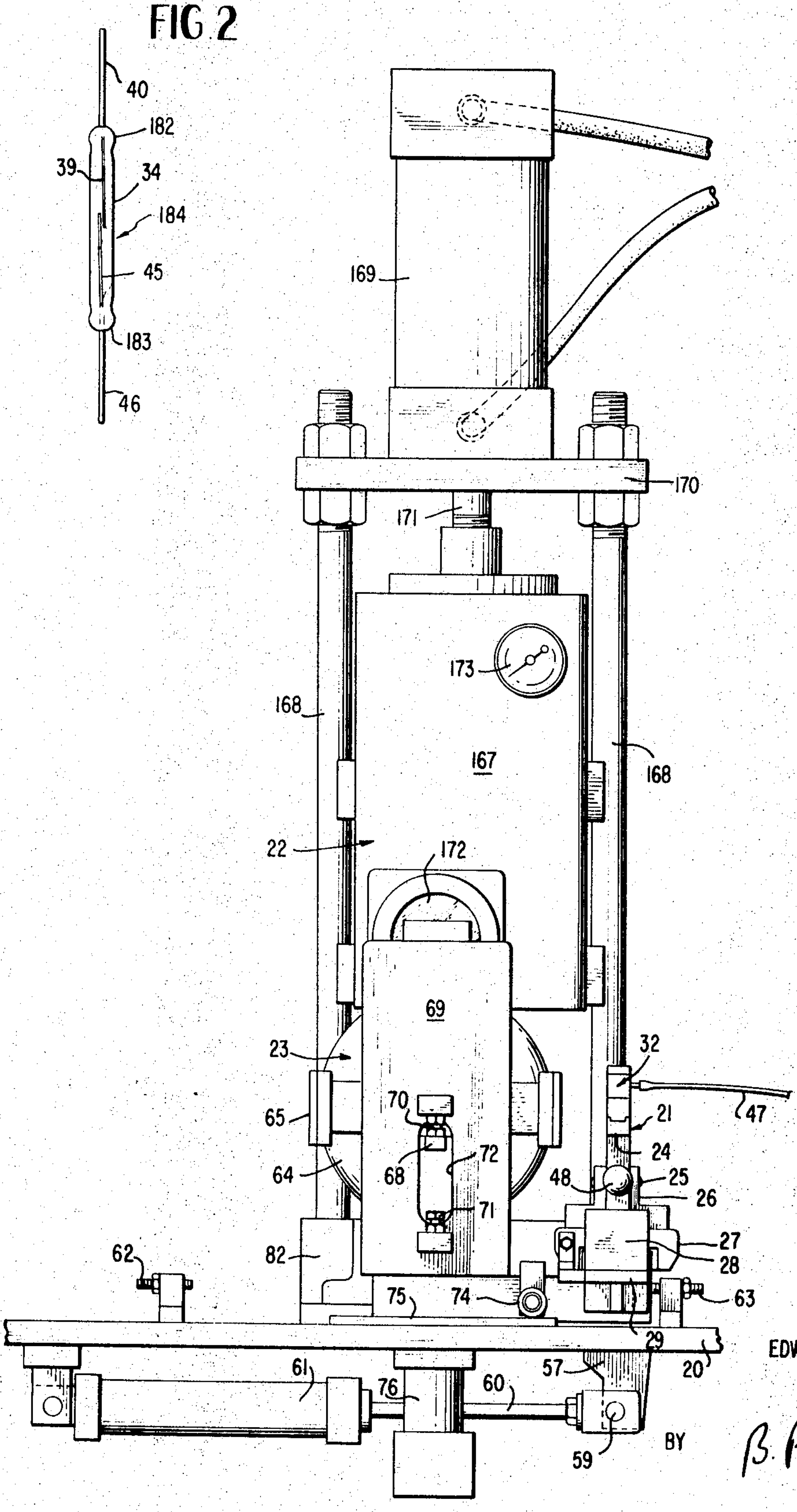
FIG. 1 is a simplified front elevational view of an apparatus for producing reed switches in accordance with the invention and showing the outboard loader at the loading station and the infrared heating means carried by the loader adjacent to the fabricating apparatus.
FIG. 2 is a side elevation of a completed reed switch produced by the invention.
Figure 3:
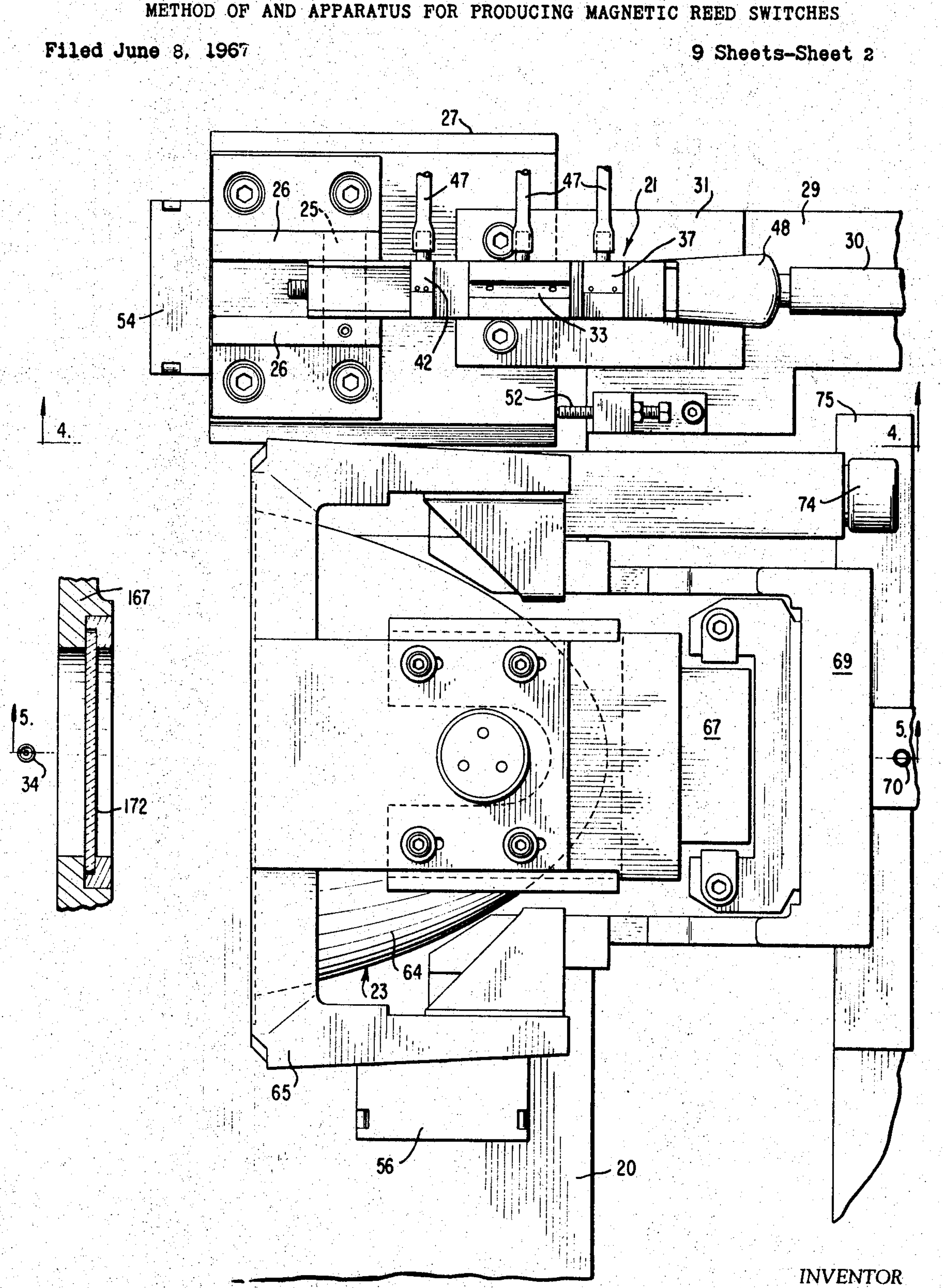
FIG. 3 is a plan view of the loader and associated parts showing relative positions of the loader and heating means with respect to a quartz window in the pressurizing chamber while the loader is at the outboard loading station.

Referring to the drawings, wherein like numerals designate like parts, the apparatus comprises a basic support table 20 for the support of a laterally shiftable and forwardly and rearwardly shiftable loader 21 shown primarily in FIGS. 1, and 3–5. The basic table 20 also supports the main fabricating head or apparatus 22 shown substantially in its entirety in FIGS. 6 and 7. FIG. 1, which is a front view of the entire apparatus, shows the relationship of the loader to the fabricating head 22 when the loader is retracted and shifted to the outboard loading station. As shown in FIG. 1, at this time, an infrared heat generating means 23 which shifts laterally in unison with the loader 21 is directly in front of the fabricating head or apparatus 22 at the active position for making the lower glass seal, as will be fully described.

With continued reference primarily to FIGS. 1 and 3–5, the loader 21 comprises an L-shaped mounting bracket 24 pivoted for vertical swinging movement on a pivot pin 25, carried by a rigid bracket structure 26, in turn rigidly mounted upon a forwardly shiftable and retractable horizontal slide or carriage 27. The slide 27 is operated by an extensible and retractable horizontal pneumatic cylinder-piston unit 28, fixed to an underlying support member 29 and having its piston rod 30 secured to an L-shaped connector 31, in turn secured rigidly to the carriage 27.

The loader further includes a vacuum chuck or holder 32 which forms an important part of the apparatus. The holder 32 has a central cylindrically curved seat 33 adapted to receive the cylindrical glass envelope or tube 34 to each reed switch. Two or more vacuum ports 35 communicate with the bottom of the seat 33 for holding the envelope 34 firmly in place without movement, once the envelope has been manually placed in the seat 33. The holder 32 also includes a stop shoulder 36 for positively positioning one end of the glass envelope, FIG. 4, and an adjacent flat ledge 37, having spaced vacuum ports 38, this ledge adapted to receive the flattened end portion 39 of an upper reed 40 thereon. The ledge 37 has an accurately formed longitudinal shoulder 41 against which the side of the flattened reed portion 39 may rest for proper alignment in the holder and the tip of the reed should engage the stop shoulder 36. At the other end of the holder 32, a similar ledge or seating face 42 having vacuum ports 43 and a longitudinal locator shoulder 44 is provided for the reception of the flattened end portion 45 of the second or lower reed 46. The several vacuum ports 35, 38 and 43 are connected through flexible tubes 47 with a convenient source of vacuum, not shown. When the vacuum is active, the three switch components 34, 40 and 46 will be firmly and fixedly held on the loader in the proper position to be carried into the holding jaws of the fabricating apparatus.

Figures 4, 14:
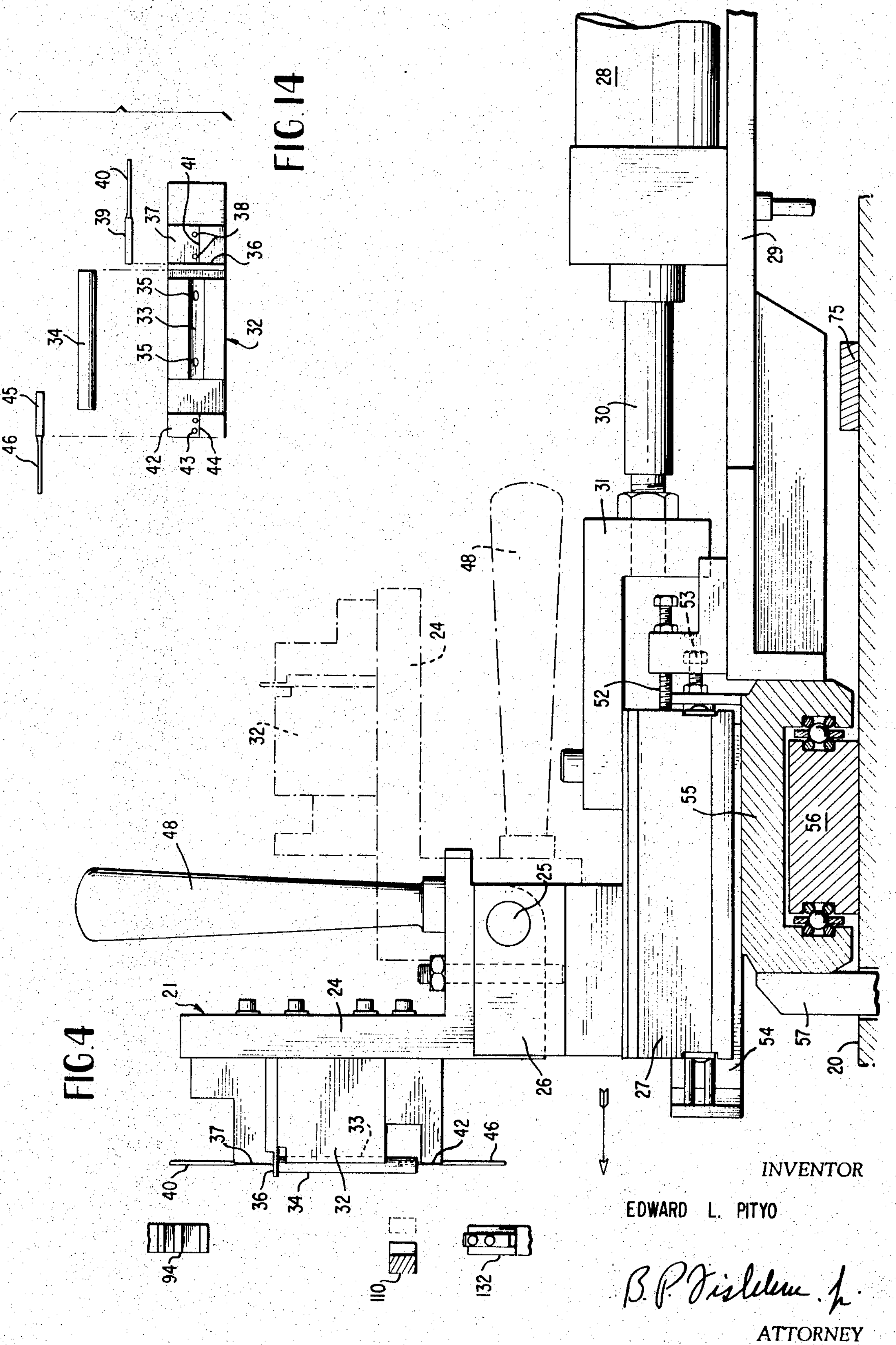
FIG. 4 is a vertical section taken on line 4—4 of FIG. 3 and particularly showing the outboard loader and associated elements.
FIG. 14 is a diagrammatic plan view showing a vacuum work holder or loader and the two reeds and the glass envelope which are held thereby.

A handle 48 is provided on the pivoted bracket 24 to allow the loading operator to conveniently pivot the bracket 24 from a horizontal loading position, shown in broken lines in FIG. 4, to the upright transfer position, shown in full lines in this figure. In the transfer position, the glass envelope and reeds are held in a vertical plane for carrying to the holding jaws of the fabricating head. One upper reed holding jaw 94 is shown in FIG. 4, along with an intermediate glass envelope holder or jaw 110 and one lower reed jaw 132. These elements and their companion holding or clamping jaws will be further described in connection with the fabricating head 22, FIGS. 6 and 7. Suitable stop faces are provided to arrest the movement of the bracket 24 in its horizontal and vertical positions. The holder 32 moves bodily forwardly and rearwardly with the slide 27 under influence of cylinder-piston unit 28. Rearward movement is accurately limited by an adjustable screw stop 52 on the member 29, FIG. 4, whereas forward movement of the holder 32 toward the jaws 94, 110 and 132 is accurately limited by another adjustable screw stop 53 which is engaged by the connector 31.

The slide 27 reciprocates upon a guide structure 54, and this guide structure is suitably rigidly mounted upon a laterally shiftable ball bearing carriage 55 operating at right angles to the slide 27 or transversely of the line of forward movement and retraction of the holder 32. The horizontal support member 29 and cylinder-piston unit 28 and associated parts are all bodily movable with the carriage 55 and suitably secured thereto. Ball bearing carriage 55 rides on a fixed guide 56 secured to the table 20. The carriage 55 has a depending extension 57 secured thereto and projecting below the table 20 through a slot 58 thereof and connected at its lower end, as at 59, with the piston rod 60 of another extensible and retractable pneumatic cylinder-piston unit 61 suitably mounted beneath the table 20. A pair of adjustable screw stops 62 and 63 on the table 20 limit travel of the carriage 55 in opposite directions accurately, as clearly shown in FIG. 1. Consequently, through the described arrangement, the holder 32 is power shiftable toward and away from the jaws 94, 110 and 132 and also shiftable laterally into and away from alignment with the jaws, as will be further discussed.

As mentioned previously, the infrared heat generating means 23 shifts laterally in unison with the loader including holder 32. This means comprises a gold-plated parabolic reflector 64 suitably mounted in a frame 65 which is attached as at 66 to a vertically shiftable carriage 67 including a horizontal arm 68. The carriage 67 operates on a vertical guide structure 69 having upper and lower adjustable screw stops 70 and 71 which accurately limit the vertical travel of the arm 68 in both directions, the arm operating through a clearance slot 72 in the guide structure 69. This guide structure has a horizontal base portion 73 fixed to the carriage 55 for movement therewith laterally of the fabricating head 22.

The guide structure 69 and parts carried thereby all move laterally with the carriage 55 but do not move at right angles to this carriage under influence of the cylinder-piston unit 28. It is only the support bracket 24 and the holder 32 and associated parts which are moved by the unit 28. To further stabilize the movement of the carriage 55, a roller 74 on the outer side of the structure 69 engages a level track 75 on the top of table 20.

In order to raise and lower the heat generating means 23 at the proper times for producing the upper and lower glass seals, there is provided a vertical pneumatic actuator or cylinder unit 76 suitably rigidly secured to the base portion 73 and having a plunger 77 which is extended and retracted to raise and lower the carriage 67 and the infrared heat generating means 23. As stated, the stops 70 and 71 accurately establish the limits of movement of the carriage 67 upwardly and downwardly under influence of the unit 76. Within the confines of the reflector 64 is mounted a conventional source 78′ of infrared heat or energy.

Referring now to FIGS. 6 through 13, the reed switch fabricating head 22, previously mentioned, comprises a main rigid support bracket 78 which is L-shaped so as to include a horizontal base 79 and an upright portion 80. The base 79 is suitably rigidly anchored within the chamber 81 of a bottom shallow pressure housing section 82 having a mounting flange 83 suitably rigidly secured to the table 20. The housing section 82 is rectangular as viewed from the top thereof, FIG. 10, and has a gas sealing gasket 84 extending continuously around its top. The major components of the fabricating head 22 are all disposed on the heavy support bracket 78.

Figures 8, 9, 9A:
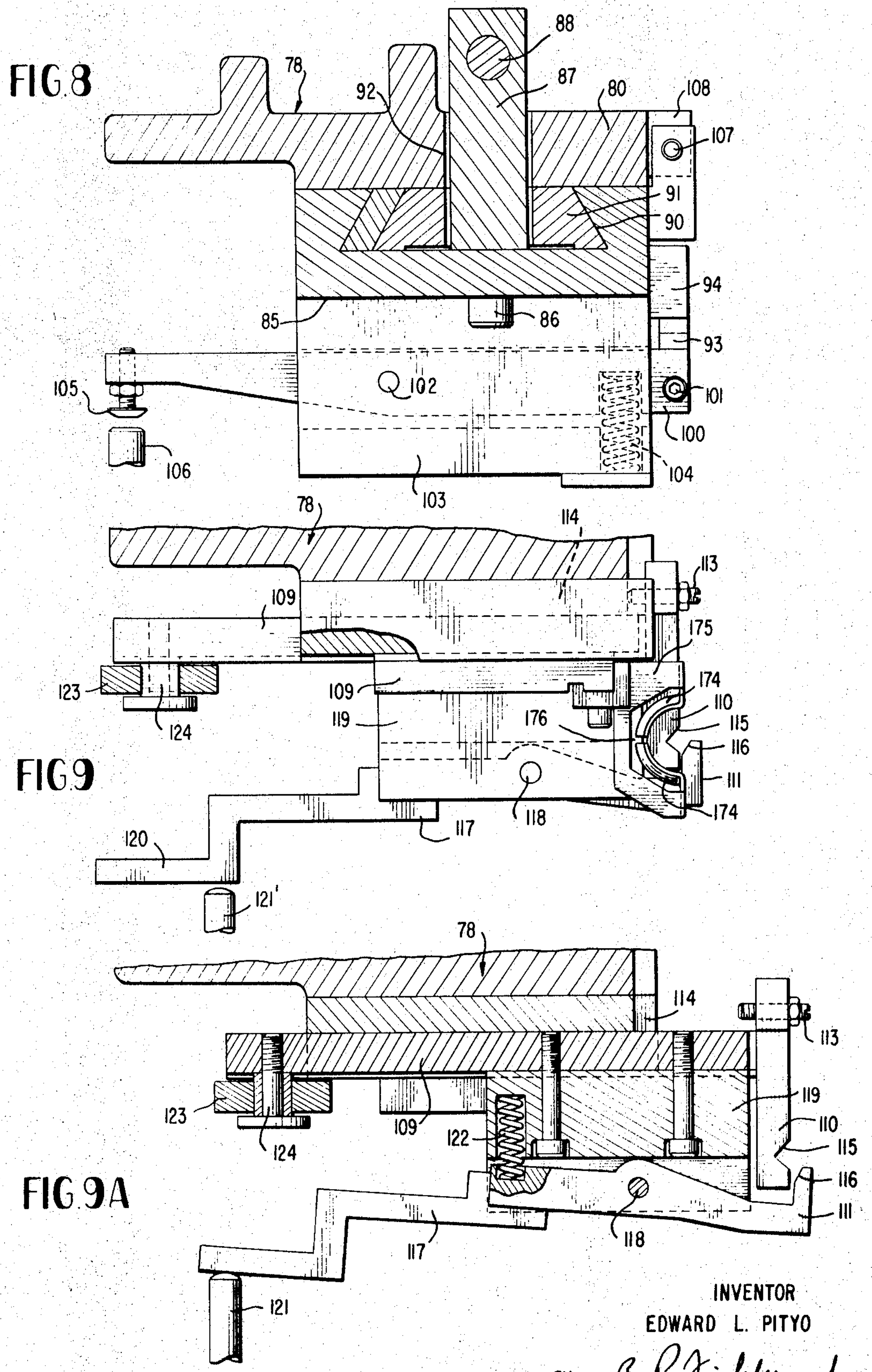
FIG. 8 is a fragmentary horizontal section taken on line 8—8 of FIG. 7.
FIG. 9 is a similar view taken on line 9—9 of FIG. 7 and showing particularly the upper heat reflector structure and the glass envelope holding jaws in closed position.
FIG. 9A is another section similar to FIG. 9 taken on substantially the same line, with parts omitted and additional parts in cross section, and showing the glass envelope holding jaw open.

More specifically, an upper vertically shiftable slide 85 is mounted for movement on the support bracket 78 and this slide is rigidly connected at 86 with a crosshead 87, in turn rigidly mounted upon the top of a piston rod extension 88, operated from a suitable power unit below the table 20, not shown. The rod extension 88 has a gas-tight seal 89 where it enters the chamber 81. As shown in FIG. 8, the slide 85 has a dovetail groove 90 slidably receiving a dovetail key or guide 91 on the bracket 78. When movement of the slide 85 takes place, the crosshead 87 moves in a clearance slot 92 formed through the vertical portion 80 of bracket 78.

The vertically shiftable slide 85 carries at its lower end and at the forward side thereof the upper reed holding clamps or jaws 93 and 94 which receive and hold the upper reed 40 during fabrication of each reed switch. The jaw 94, FIG. 11, has two gripping lands 95 and a closure stop 96 projecting somewhat forwardly of the gripping lands. The jaw 94 is relatively stationary during use but is adjustably secured at 97 to the forward side of vertical slide 85. The jaw 93 moves or pivots relative to the jaw 94 between open and closed positions, and has a single gripping land 98 midway between the lands 95, the jaw 93 having a cut-back face 99 to engage the stop 96.

The movable jaw 93, FIG. 8, is carried by the forward end of an operating lever 100 and rigidly secured thereto as at 101. The lever 100 is pivotally secured intermediate its end to a vertical pivot pin 102 on the horizontal portion 103 of vertical slide 85. A compressible coil spring 104 within the horizontal portion 103 constantly urges the movable jaw 93 into closed engagement with the fixed jaw 94. A rear end extension of the lever 100 carries an adjustable screw stop 105 engaged by a push actuator 106 for swinging the jaw 93 to open position, FIGS. 11 and 12, at desired times. The actuator 106 is conventional and may form the piston rod extension of an air-operated cylinder-piston unit or like conventional actuator. Downward movement of the carriage 85 and upper jaws 93 and 94 is accurately limited by an adjustable screw stop 107 on carriage 85, engageable with a rigid stop element 108 on support bracket 78.

Below the upper jaws 93 and 94 and bodily carried on a horizontal forwardly and rearwardly shiftable dovetail slide 109 are relatively fixed and movable glass holding jaws 110 and 111. The fixed jaw 110 is rigidly secured as at 112 to the slide 109 and the rearward movement of the jaw 110 with slide 109 is limited by an adjustable screw stop 113 which abuts a rigid extension 114 of bracket 78. The jaw 110 has a V-shaped notch or recess 115 to receive the tubular glass envelope 34 in a vertical position, as will be described.

The movable jaw 111 has a coacting beveled gripping face 116 slightly converging with the remote side of the recess 115. The jaw 111 is carried by an operating lever 117 pivoted between its ends on a vertical pivot element 118 carried by an extension 119 of the horizontal slide 109. The lever 117 has a rear end extension 120 operated by a conventional power actuator 121 to cause the movable jaw 111 to swing away from the jaw 110 or to be opened, FIG. 9A. A spring 122 housed within the slide extension 119 serves to maintain the jaw 111 in the closed position, FIG. 9.

The horizontal slide 109 carrying both glass jaws 110 and 111 is shiftable forwardly and rearwardly by means of a vertical forked operating arm 123 engaging a bushed actuating pin 124 carried by slide 109. The arm 123 is pivoted at 125 intermediate its ends to a fixed extension 126 of bracket 78. An upper extension 127 of arm 123 is pivotally connected at 128 to an extensible and retractable plunger 129 of a pneumatic cylinder-piston unit 130 having its opposite end connected at 131 to the fixed bracket 78. Extension of the plunger 129 from the unit 130 turns the arm 123 counterclockwise on the pivot 125 and causes the slide 109 and the two jaws 110 and 111 to move horizontally forwardly and beyond the vertical plane of the upper reed jaws 93 and 94. As will be described, this movement of the slide 109 is utilized when each finished switch is to be ejected from the apparatus.

Spaced below the glass envelope holding jaws 110 and 111 in substantial alignment with the upper jaws 93 and 94 are lower reed fixed and movable jaws 132 and 133. The fixed jaw 132 is secured at 134 to a holder 135 movable forwardly and rearwardly with a horizontal dovetail slide 136. The slide 136 operates within a fixed guide 137, rigidly mounted upon the horizontal portion or base 79. The slide 136 has its rear end connected with a reciprocatory rod 138 sealed at 139 where it emerges from the housing section 82. The rod 138 is connected with and operated by a pneumatic cylinder-piston unit, not shown.

Forward movement of the slide 136 and all parts mounted thereon including jaws 132 and 133 is limited by an adjustable screw stop 140, mounted on a fixed block 141 of the support bracket 78, the screw stop engaging a shoulder 142 of the slide structure. In a similar manner, retraction of the slide 136 is limited by an adjusting screw 143 carried by an extension 144 of the slide 136, the screw 143 adapted to abut an upstanding stop element 145 rigidly secured at 146 to the fixed guide 137 and base 79. Thus, the movement of the slide 136 forwardly and rearwardly can be accurately limited or regulated. To facilitate finely adjusting the slide 136 by means of a sine bar, to be described, for establishing the final gap between the reeds, a vertical semi-cylindrical rib 147 is mounted immediately below the fixed jaw 132, as shown in the drawings. The sine bar, to be described, may engage this gapping rib 147 and push the slide 136 slightly rearwardly together with the jaws 132 and 133 to establish the desired gap between the switch reeds, as will be further described hereinafter. This is an optional feature of the invention and the gap may be set by retracting the rod 138 until the screw stop 143 engages the stop element 145.

Figure 11:
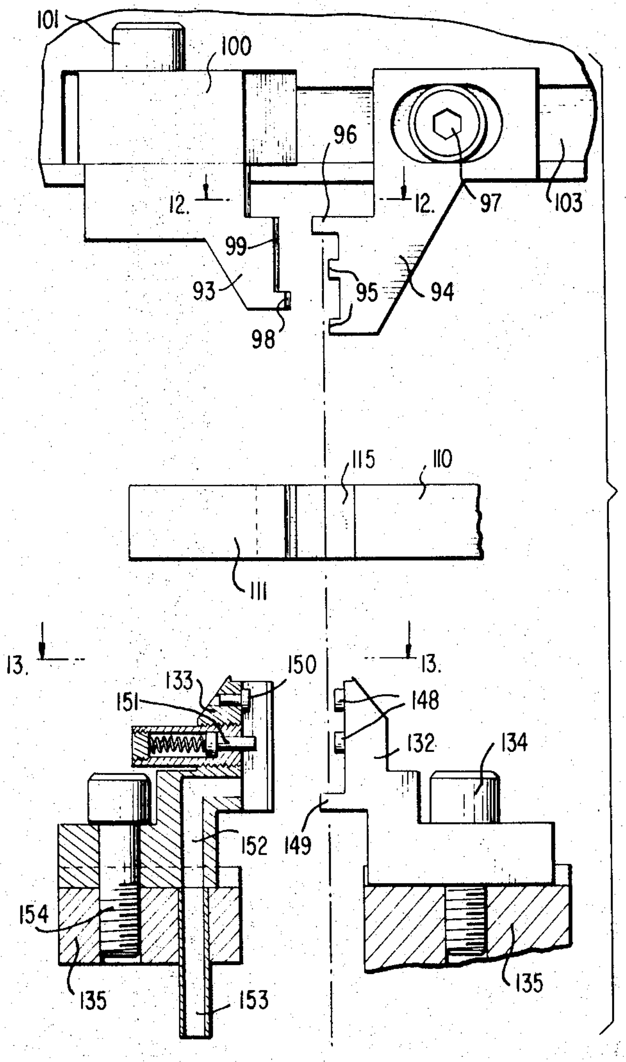
FIG. 11 is an enlarged front elevational view, partly in cross section, showing the three sets of work holding jaws of the apparatus in open positions.
Figure 12:
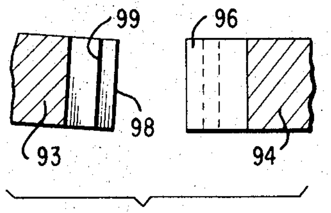
FIG. 12 is a fragmentary horizontal section taken on line 12—12 of FIG. 13.
Figure 13:
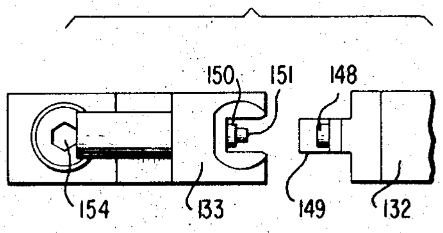
FIG. 13 is a horizontal view in plan of the lower jaws taken on line 13—13 of FIG. 11.

Referring to FIGS. 11 and 13, the fixed lower jaw 132 has a pair of fixed contact pins 148 rigid therewith and in permanently spaced relation for engaging one side of the lower reed. There is also a jaw closure limit stop 149 on the fixed jaw 132. The opposing movable jaw 133 has an upper gripping pin 150 opposite the uppermost pin 148 and a lower spring-loaded gripping pin 151 arranged opposite the other pin 148 of the fixed jaw. This particular arrangement has been found to operate most satisfactorily in the holding and stabilizing of the lower read 46 during the fabrication of the switch. As shown in FIG. 11, a passage 152 for an inert forming gas, such as a mixture of nitrogen and hydrogen, is formed through the movable jaw 133. The passage 152 communicates with a tube 153 through which the gas enters the apparatus. The glass envelope and the reeds are flushed in a conventional manner with this forming gas during the formation of the upper and lower glass seals to prevent corrosion and spalling of the reeds.

The jaw 133 is connected as at 154 to the holder 135 and the latter holder is divided for accommodating the upstanding slender pole piece 155 or extension of an electromagnet 156 anchored to the bottom of the shell or housing section 82 at 157. The upper tip of the pole piece 155 is located so that the magnetic flux can be introduced into the lower reed 46 as the latter is being held by the jaws 132 and 133. This will be further described.

Figure 7:
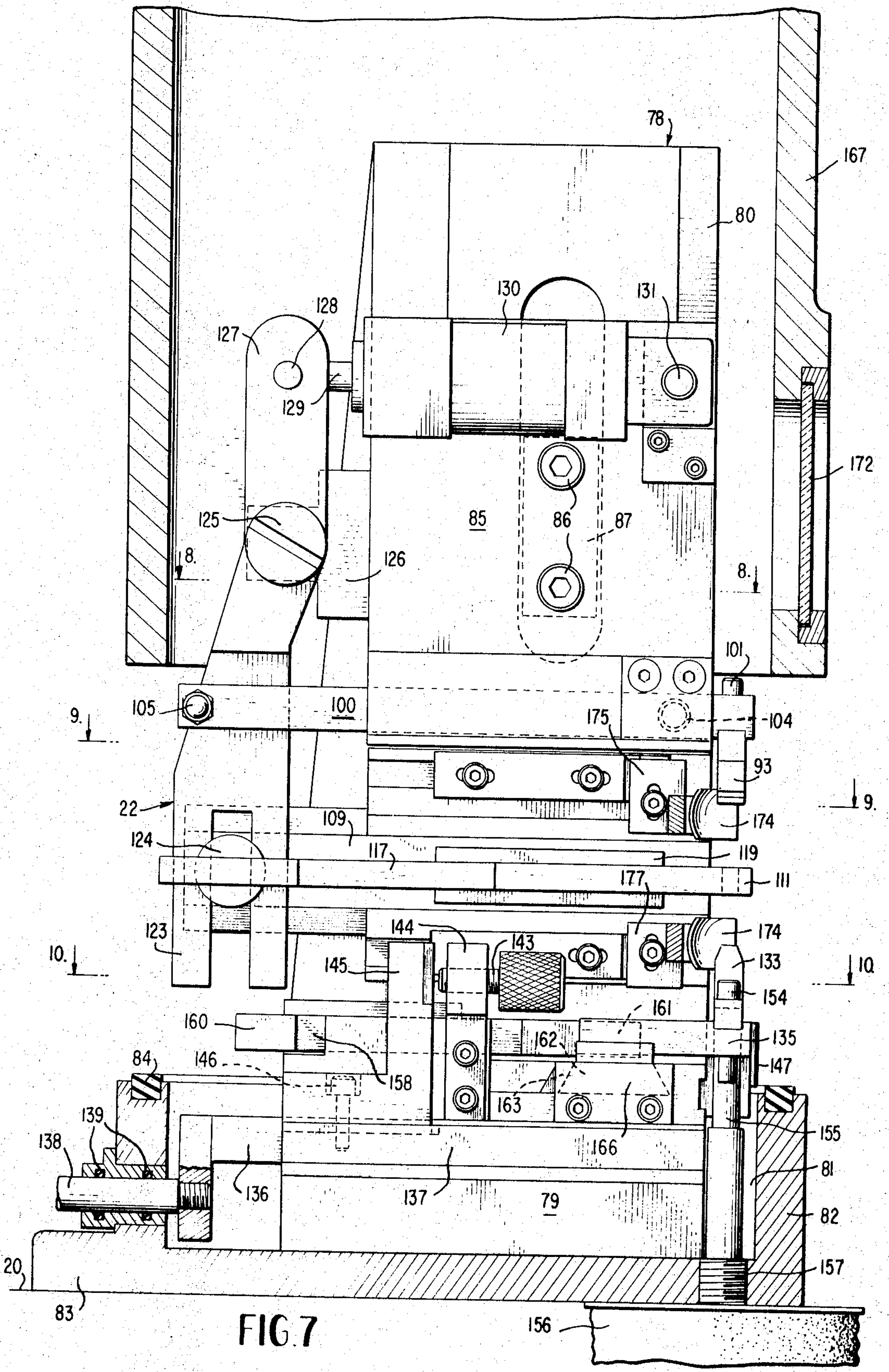
FIG. 7 is a side elevational view taken from the left-hand side of FIG. 6 with parts in central vertical section.
Figure 10:
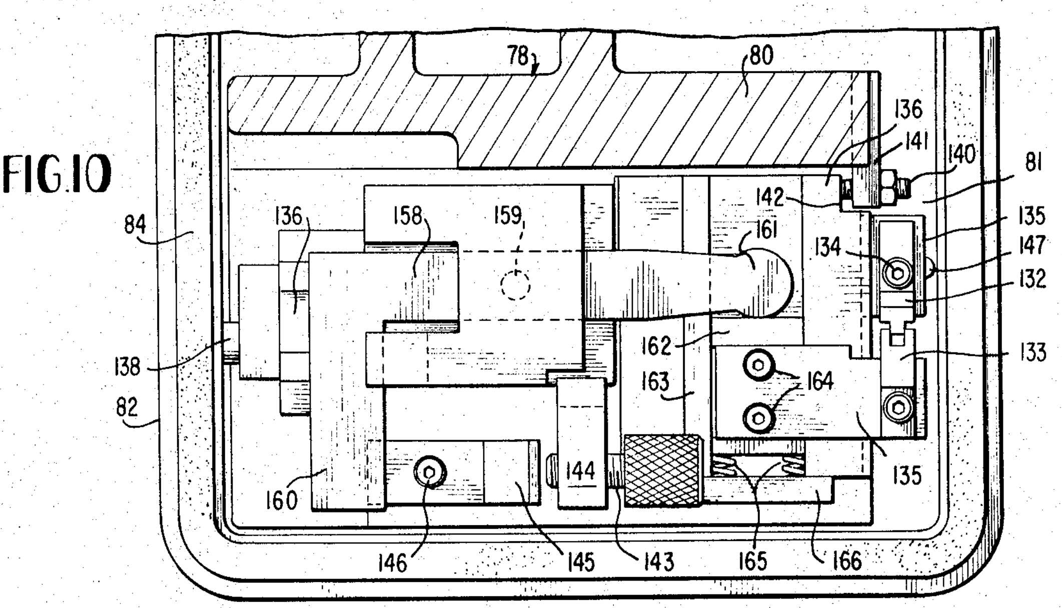
FIG. 10 is a horizontal section, with parts broken away, taken on line 10—10 of FIG. 7.

The means for opening the lower movable jaw 133 comprises an L-shaped lever 158 pivoted at 159 to the slide structure and having a side extension 160, FIG. 10, engaged by a reciprocating power actuator, not shown, similar to actuators 106 and 121. The lever 158 has a rounded cam head 161 at its forward end engaging a slide block 162 operating in a dovetail guide 163, as best shown in FIG. 7. The guide 163 extends transversely of and at right angles to the line of movement of the slide 136. The holder 135 of movable jaw 133 is secured at 164 to the slide block 162 for straight line lateral movement therewith under influence of the pivoted lever 158. Since the jaw 133 is carried by the elements 135 and 162, FIG. 10, the jaw will move toward and away from the opposing fixed jaw 132 in a straight path of movement as depicted by FIG. 13 and not on a swinging path as in the case of the upper jaw 93 or the glass holding jaw 111. The jaw 133 is biased to a normally closed position with the jaw 132 by means of springs 165 interposed between the slide 162 and a fixed abutment element 166 on the fixed guide 137. It may now be seen that the three pairs of jaws or clamping devices of the fabricating head 22 are all biased closed by spring means and one jaw of each pair or set may be moved to an open position at the required time by an independent power actuator. The performance of the jaws or clamps will be further discussed in the description of the overall operation of the invention.

The apparatus further comprises an upper vertically reciprocatory pressurizing housing section 167, slidable on vertical guide bars 168 whose lower ends are rigid with the lower fixed housing section 82. The lower end of housing section 167 is adapted for gas-tight engagement with the gasket 84 when lowered or closed. To raise and lower housing section 167, there is provided a pneumatic cylinder-piston unit 169 mounted on a cross plate 170 secured to the tops of guide bars 168. An extensible and retractable piston rod extension 171 of the unit 169 is connected with the top of housing section 167 to raise and lower the same. When the housing section 167 is fully elevated, FIGS. 1, 6 and 7, its lower end is above and clear of the upper reed jaws 93 and 94. When fully lowered into contact with the sealing gasket 84, a fully enclosed pressure chamber is formed and encloses the fabricating head 22 or mechanism so that the final glass seal of each reed switch may be made under pressure above atmospheric pressure, such as thirty pounds per square inch, approximately, or the like. The housing section 167 is provided near its lower end and at its forward side with a quartz window 172 through which the lower and final glass seal is completed while the housing is closed and pressurized. The housing section 167 may include a suitable pressure gauge 173.

Novel means are provided to reflect heat from the infrared source 23 onto the back of the glass envelope 34 at the formation of the upper and lower seals. This means comprises an upper back reflector structure including spaced back reflector parts or sections 174, each secured adjustably to a holder 175, in turn secured to the main vertical slide 85 so as to move up and down vertically with the upper reed jaws 93 and 94. The reflector sections 174 have their reflecting faces plated with gold and these faces are spherically curved, as shown. There is an adjustable gap 176 between the two reflector sections which eliminates collection of lead oxide from the glass and other contaminants on the center of the reflecting face directly behind the work. Also, the split structure of the back reflector allows lateral adjustment of the two sections 174 for more perfect focusing and concentrating of heat on the back of the work.

In a similar manner, a lower back reflector of heat comprises another pair of the identical gold-plated reflector halves or sections 174, similarly laterally adjustably secured to a holder 177 which can be slightly vertically adjusted, as shown in FIG. 7. The lower back reflector sections 174 have a fixed position relative to the lower jaws 132 and 133 and move back and forth with the slide structure 136 and associated elements. Preferably, jets of air or inert gas are directed through the gaps 176 between the upper and lower back reflector sections to further eliminate the accumulation of oxide deposits on the back reflectors. Suitable small nozzles, not shown on the drawings, are provided for directing such air or inert gas jets forwardly through the gaps 176 during the forming of the upper and lower seals.

Figures 15, 16, 17:
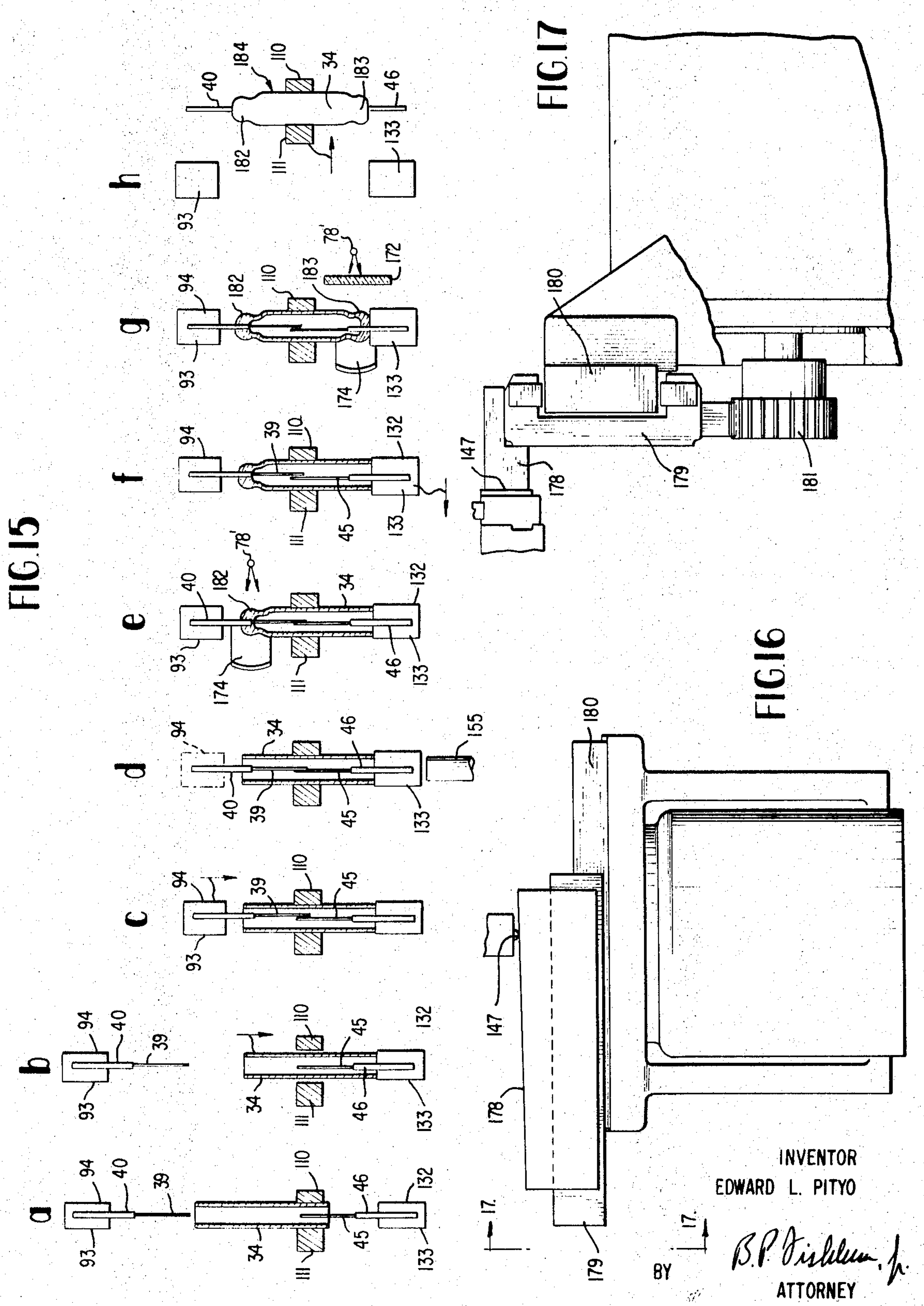
FIG. 16 is a plan view of a sine bar employed for accurately gapping the reeds.
FIG. 17 is a side elevational view taken on line 17—17 of FIG. 16.

FIGS. 16 and 17 show a sine bar 178 which may be employed to set the gap between the two switch reeds with extreme accuracy. As shown diagrammatically in FIGS. 16 and 17, the sine bar is mounted upon a suitable carriage 179 driven along a guide structure 180 by power gearing 181 or the like. The inclined forward face of the sine bar slidably contacts the aforementioned rounded rib 147 on the carrier for the lower jaws 132 and 133 so that movement of the sine bar with the carriage 179 will shift the lower reed jaws a very slight amount with the slide 136 to establish the desired reed gap. The sine bar may have its working face laid out to produce, for example, .001 inch movement of the slide 136 and lower jaws for each quarter-inch of lengthwise movement of the sine bar. Thus, the reed switches may be gapped with extreme accuracy by utilizing the sine bar and switches having different gaps may be created by changing the extent of movement of the sine bar. After the sine bar 178, acting on the rib 147, pushes the slide 136 and the lower jaws rearwardly slightly, the slide may be returned forwardly against the forward stop 140 by means of the plunger rod 138.

Alternatively, in some cases, the sine bar method of gapping the switches may be dispensed with and the power unit including plunger 138 may be relied upon to set the switch gap by properly adjusting the screw stop 143 to regulate the inward movement of the slide 136 for gapping the switches. With this arrangement, a standard or fixed gap would be produced in every switch until the screw 143 has its setting changed. When the sine bar is utilized, the screw 143 is not relied upon to establish the actual gap between the reeds.

GENERAL OPERATION

Figure 5:
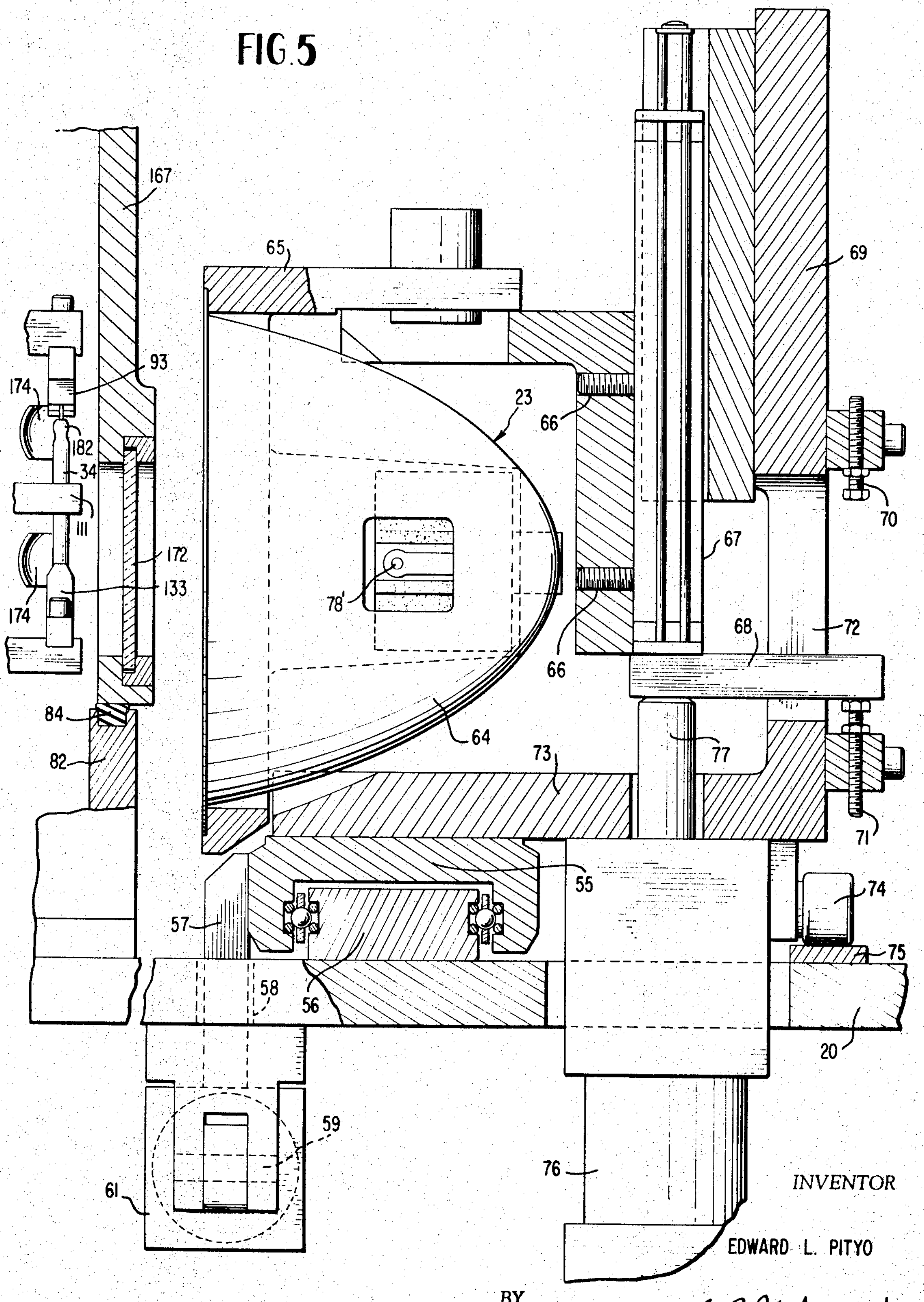
FIG. 5 is a similar vertical section taken on line 5—5 of FIG. 3 and particularly showing the infrared heat generating means in relation to a quartz window through which the lower seal is completed.
Figure 6:
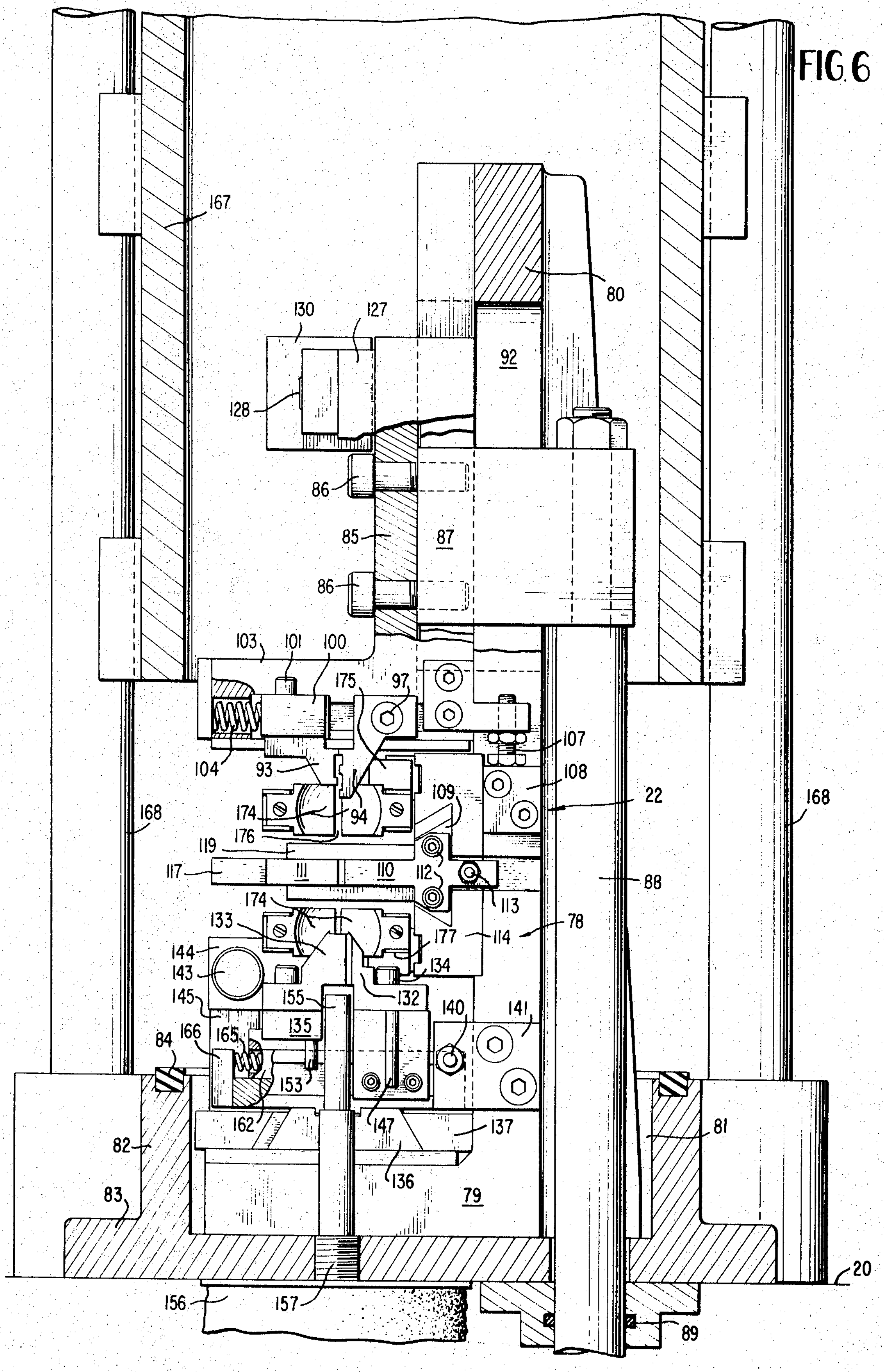
FIG. 6 is a front elevational view of the fabricating apparatus with parts in central vertical section.

The general mode of operation of the apparatus may be best understood primarily by considering FIGS. 14, 4 and 15*a* through 15*h*. An operator loads the reeds 40 and 46 and the tubular glass envelope 34 into the holder 32 with the vacuum turned on and with the holder in the down or horizontal position shown in FIG. 4. At this time, the holder 32 is at the outboard or right hand side position shown in FIGS. 1 and 3 and the piston rod 60 is extended from the unit 61. The heating source or unit 23, which also moves laterally on the carriage 55, is in the active position directly in front of the fabricating head 22. FIG. 1 and FIG. 5 both show the heating unit 23 in the lowered position as for producing the second or bottom seal on the reed switch. When the plunger 77 is extended, the heating unit 23 is elevated to the proper position for producing the upper seal and the stop 70 will establish the upper position of the heating unit.

Initially, the holder 32 is in a retracted position away from the fabricating head 22 under influence of the rod or plunger 30. The operator swings the handle 48 and holder 32 to the upright position shown in FIG. 4 and the holder is then shifted laterally toward the fabricating head 22 to a station where the switch components can be received by the jaws of the head 22. At this time, the three sets of jaws 93, 94; 110, 111 and 132, 133, are all fully open against the action of their springs, under influence of the power actuators 106, 121, etc. By means of the plunger 30, the holder 32 is now advanced toward the three sets of jaws while the jaws are still open and the upper reed 40, which extends above the holder 32, will enter between the upper jaws 93 and 94 while the lower reed 46 projecting below the holder 32 will enter between the lower jaws 132 and 133. Simultaneously, the glass envelope 34 will enter the recess 115 of the open jaws 110 and 111. All of the jaws are now closed and the vacuum supply to the holder 32 is turned off. The holder retracts away from the jaws with the rod 30 and returns automatically to the outboard loading station by means of the rod or plunger 60. The appropriate adjustable stops limit and regulate all of these movements accurately. Diagrammatic FIG. 15*a* shows the relative positions of the parts immediately following the closing of the three sets of jaws. It may be observed in FIG. 15*a* that the glass envelope 34 does somewhat overlap the lower reed at this time.

The middle jaws 110 and 111 now open very slightly by movement of the jaw 111 under influence of a short stroke actuator 121′, FIG. 9, separate from the longer stroke actuator 121 in FIG. 9*a*. When the middle jaws are opened slightly, the glass envelope 34 drops so as to rest upon the closed lower jaws 133 and 132, FIG. 15*b*. All other parts remain in the same positions shown in FIG. 15*a*. The middle jaws 110 and 111 are now closed upon the glass envelope by retraction of actuator 121′. Almost simultaneously, the upper jaws 93 and 94 descend, as shown in FIG. 15*c*, under control of the rod 88 and main vertical slide 85. The purpose of this movement is to establish proper overlapping of the two reed parts 39 and 45, as depicted in FIG. 15*c*, and this degree of overlapping will be maintained until the completion of the reed switch. The precise degree of overlapping will be determined by the adjustable stop 107. Concerning the overlapping operation, it will be understood that initially the reed parts 39 and 45 do not lie in a common plane and thus will not interfere when they are moved into overlapping relation. The supporting surfaces 37 and 42 of holder 32 are machined so as to be offset slightly in different planes and this condition is maintained when the two reeds are first introduced into their holding jaws 93, 94 and 132, 133. Consequently, when the upper jaws move downwardly, FIG. 15*c*, to overlap the reeds, there will be no interference.

At this time, the electromagnet 156 is energized and through the pole piece 155 which is in close proximity to the lower reed 46, FIG. 15*d*, the two reed parts 39 and 45 are magnetically latched together. The upper jaws 93 and 94 are now opened to relieve any mechanical stress or misalignment in the upper reed 40 and the upper jaws 93 and 94 are then reclosed on the upper reed. At this time, the electromagnet may be de-energized or, if preferred, it may remain energized and this practice may be varied in the practice of the method. The parts are now ready for the formation of the upper glass seal 182, FIG. 15*e*.

At this time, the extensible plunger 77 of pneumatic unit 76 is holding the infrared heat source 23 in the elevated position limited by the stop 70 and heat producing element 78, as shown in FIG. 15*e*, is properly aligned with the upper end of the glass envelope 34 and the upper reflector sections 174 rearwardly of the work. The reflector 64 reflects heat energy on the front of the glass and the back reflector sections 174 reflect heat onto the back of the glass so that the glass envelope is heated and sealed to the upper reed around substantially its entire circumference, as evenly as possible. The formation of the upper seal 182 by this method requires only a few seconds, usually three to four seconds.

After completion of the upper seal 182, the two reeds 40 and 46 are gapped to about .006 inch by operation of the sine bar 178 in conjunction with the rib 147, as previously described, or alternatively, by retracting the plunger 138 and lower jaws until the screw stop 143 establishes the proper gap. The slight shifting of the lower jaws 132 and 133 rearwardly by the sine bar is shown by the arrow at the bottom of FIG. 15*f*.

The pressurizing housing section 167 is now lowered by plunger 171 after sine bar 178 is moved away. If the sine bar is not used, the entire lower seal, FIG. 15*g*, may be made through the quartz window 172 with the pressurized housing closed throughout the lower seal. The infrared source or lamp 23 now also shifts to the lowered position against stop 71 and the heating element 78′ is in proper alignment with the parts to make the lower and final glass seal 183 through the quartz window 172 and with an elevated pressure of about 30 p.s.i. inside of the closed housing composed of sections 82 and 167. When the sine bar 178 is utilized for gapping, the bottom seal 183 is started somewhat before the housing section 167 is lowered and pressurized. This gives time to remove the sine bar which would otherwise interfere with the closing of the housing. The bottom seal is completed through the quartz window 172. The formation of the bottom seal is illustrated in FIG. 15*g* which includes the lower back reflector sections 174 which cooperate with the lamp 23 in the lower position of the lamp. It should be understood in connection with the glass sealing operations that tinted glass is employed for the element 34 so as to absorb the infrared heat. This technique is well known.

It should also be realized that between the steps shown in FIGS. 15*d* through 15*g*, the glass envelope 34 is purged with a forming gas introduced conventionally through the passage 152 of the lower jaw 133. It requires about six seconds to cool the work after completion of the lower seal 183.

Following this, the pressure is released from housing 167–82 and the housing section 167 is elevated by the plunger 171 and the lamp 23 is returned to its normal elevated position by plunger 77. The upper and lower reed jaws 93, 94 and 132, 133 are now opened by their actuators 106, etc. The slide 109 is now advanced forwardly to the eject position shown particularly in FIG. 9*a* by operation of the cylinder-piston unit 130 and the associated arm 123. The glass holding jaw 111 is now opened, and the completed reed switch 184, FIG. 15*h*, is dropped or ejected into a suitable conveyor chute, not shown. The slide 109 and jaws 110 and 111 are now retracted by the power unit 130 to the normal receiving position and the cycle of operation is completed and the apparatus is ready to be recycled.

It should be observed that during the time between the retracting and returning of the holder 32 to the outboard position and the completion of the reed switch, the operator has ample time to reload the holder for the next operating cycle. In fact, one operator may service two or three machines without difficulty.

Also, the invention apparatus as disclosed herein may easily be incorporated in a multi-unit turret-type machine where mass production of switches warrants such an arrangement. The sine bar gapping apparatus is particularly adapted to be used with such a multi-unit turret machine for efficiently and accurately gapping the reeds of all of the units.

It is believed that the numerous advantages of the invention, its extreme accuracy and economies, will now be readily appreciated by those skilled in the art.

It is to be understood that the form of the invention herewith shown and described is to be taken as a preferred example of the same, and that various changes in the shape, size and arrangement of parts may be resorted to, without departing from the spirit of the invention.

I claim:

1. The method of producing magnetic reed switches comprising the steps of positioning with positioning means a pair of metal reeds within an initially open-ended glass envelope with the interior terminals of the reeds in overlapping relation in the envelope, effecting a first glass-to-metal seal between one metal reed and the glass envelope at one end of the envelope by simultaneously radiating heat energy toward one side of the envelope and reflecting such energy in a reverse direction toward the opposite side of the envelope with a first reverse energy reflecting means, providing a gap at the center of the first reverse energy reflecting means and purging said gap with a first stream of gas to prevent oxide deposits from accumulating on the first reverse energy reflecting means during the formation of said first glass-to-metal seal, accurately gapping said reeds, and then effecting a second glass-to-metal seal between the other metal reed and the glass envelope at the other end of the envelope by simultaneously radiating heat energy toward one side of the envelope and reflecting such energy reversely toward the opposite side of the envelope with a second reverse energy reflecting means, providing a gap at the center of the second reverse energy reflecting means and purging said gap with a second stream of gas to prevent oxide deposits from accumulating on the second reverse energy reflecting means during the formation of said second glass-to-metal seal.

2. The method in accordance with claim 1, and the additional steps of magnetically latching said reeds in overlapping relation in the glass envelope prior to the formation of the first glass-to-metal seal, and releasing momentarily one reed while the magnetic latching of the reeds is in effect to relieve the reeds of mechanical stress and misalignment.

3. The method in accordance with claim 2, and the additional step of shifting each sealed reed switch to an ejection station and ejecting the reed switch at such station.

4. The method in accordance with claim 1, and the additional steps of loading the pair of reeds into a holder at a point remote from said positioning means for the reeds, shifting the holder adjacent to said positioning means so that said positioning means may be activated to position the reeds within the glass envelope, and then returning the holder to said remote point so that one reed switch may be fabricated while the remote loading of parts for another reed switch is taking place.

5. Apparatus for producing magnetic reed switches comprising means to position a pair of metal reeds in overlapping relationship within the interior of an initially open-ended glass envelope, means to effect a glass-to-metal seal between one metal reed and one end portion of the envelope including a source of radiant heat energy, a forward reflector of said radiant heat energy and a first divided back reflector for the radiant heat energy, said divided back reflector being in two laterally adjustable reflector sections, whereby a variable width gap is established in the first back reflector, means for directing a first purging gas stream through said gap to prevent the accumulation of oxide deposits on the first divided back reflector, means to accurately gap said reeds subsequent to the formation of said glass-to-metal seal, a second divided back reflector for said radiant heat energy being in two laterally adjustable reflector sections, whereby a variable width gap is established in the second back reflector, means for directing a second purging gas stream through said gap to prevent the accumulation of oxide deposits on the second divided back reflector, and means for shifting said forward reflector into coacting alignment with either said first or said second divided back reflector.

6. The structure of claim 5, and wherein said means to position the pair of metal reeds comprises an upper pair of reed holding jaws, power means for raising and lowering the upper pair of jaws and power means for opening the jaws, said jaws being resiliently biased closed, an intermediate pair of holding jaws for the glass envelope, power means for shifting said intermediate jaws forwardly and rearwardly and power means for opening the intermediate jaws, the intermediate jaws being resiliently biased closed, a lower pair of reed holding jaws below the intermediate jaws and being horizontally shiftable forwardly and rearwardly and being resiliently biased closed, power means for opening and closing the lower pair of reed holding jaws, separate power means to shift the lower pair of jaws horizontally, and adjustable stop means accurately limiting the forward and rearward horizontal movement of the lower pair of jaws.

7. The structure of claim 5, and said forward reflector comprising a substantially parabolic reflector, and wherein said first and second divided back reflectors formed of said laterally adjustable reflector sections have reflective faces which are spherically concave, whereby substantially the entire circumference of the glass envelope may have radiant energy reflected thereon.

8. The structure of claim 6, and a contact rib on the horizontally shiftable lower pair of reed holding jaws, and said power means to shift the lower pair of jaws horizontally includes a sine bar having sliding engagement with said contact rib, thereby enabling the reeds to be gapped with great accuracy.

9. The structure of claim 5, and supporting means for said positioning means for said reeds and glass envelope, and an electromagnet mounted on the supporting means including an elongate pole piece having a tip extending adjacent to at least one reed to enable magnetic latching of the pair of reeds within the positioning means.

10. The structure of claim 6, and a remote loader for said glass envelope and pair of reeds, slide means for the loader carrying the loader, and power means connected with the slide means and shifting the same with the loader in opposite directions to deliver the glass envelope and pair of reeds to the intermediate, upper and lower holding jaws respectively.

11. The structure of claim 10, and adjustable limit stops for said slide means to accurately limit the movement thereof in opposite directions.

12. The structure of claim 6, and a pair of spaced fixed reed-engaging contact elements on one lower reed holding jaw, a single fixed reed-engaging contact element on the opposing lower reed holding jaw disposed opposite one of the contact elements of said pair, and a single spring-urged reciprocatory contact element on the opposing lower reed holding jaw disposed opposite the other fixed contact element of said pair.

References Cited

UNITED STATES PATENTS

| | | | |
|---|---|---|---|
| 2,697,307 | 12/1954 | Diehl | 65—154 |
| 2,882,648 | 4/1959 | Hovgaard | 65—32 |
| 2,984,046 | 5/1961 | Brewer | 65—154 |
| 3,282,670 | 11/1966 | Chanowitz | 65—155 |
| 3,369,291 | 2/1968 | Shaffer | 65—155 |
| 3,421,874 | 1/1969 | Chanowitz | 65—155 |
| 3,434,818 | 3/1969 | Chauvin | 65—152 |
| 3,460,930 | 8/1969 | Pityo | 65—155 |

S. LEON BASHORE, Primary Examiner

E. R. FREEDMAN, Assistant Examiner

U.S. Cl. X.R.

29—622; 65—32, 34, 138, 154, 155, 270; 335—151